US010021541B2

(12) United States Patent
Joseph et al.

(10) Patent No.: US 10,021,541 B2
(45) Date of Patent: Jul. 10, 2018

(54) DIRECTIONAL MESSAGING AMONG MOBILE DEVICES

(71) Applicant: Verizon Patent and Licensing Inc., Arlington, VA (US)

(72) Inventors: Peter Joseph, Pathanamthitta (IN); Guruharan Ravi, Tamilnadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 338 days.

(21) Appl. No.: 14/481,337

(22) Filed: Sep. 9, 2014

(65) Prior Publication Data

US 2016/0073242 A1    Mar. 10, 2016

(51) Int. Cl.
*H04W 4/14* (2009.01)
*H04W 4/02* (2018.01)
*H04W 4/08* (2009.01)
*H04W 4/021* (2018.01)

(52) U.S. Cl.
CPC ............ *H04W 4/14* (2013.01); *H04W 4/021* (2013.01); *H04W 4/025* (2013.01); *H04W 4/08* (2013.01)

(58) Field of Classification Search
CPC ......... H04W 4/14; H04W 4/08; H04W 4/025; H04W 4/021
See application file for complete search history.

(56) References Cited

U.S. PATENT DOCUMENTS

| | | | |
|---|---|---|---|
| 8,428,622 B1* | 4/2013 | Zhang | H04W 4/023 455/414.3 |
| 2013/0225204 A1* | 8/2013 | Mathews | H04N 21/4126 455/456.3 |
| 2014/0113556 A1* | 4/2014 | Kotecha | H04W 76/14 455/41.2 |

* cited by examiner

*Primary Examiner* — Joseph Dean, Jr.

(57) ABSTRACT

A system and method are provided for directional messaging among mobile devices. An input is received from a first mobile device, identifying a directional range for sending a message to a second mobile device within the directional range. The second mobile device located in the directional range identified in the input is identified. A location indicator showing the location of the second mobile device within the identified directional range is sent to the first mobile device. A message to be sent to the second mobile device is received from the first mobile device. In response to receiving the message, the message is sent to the second mobile device.

22 Claims, 9 Drawing Sheets

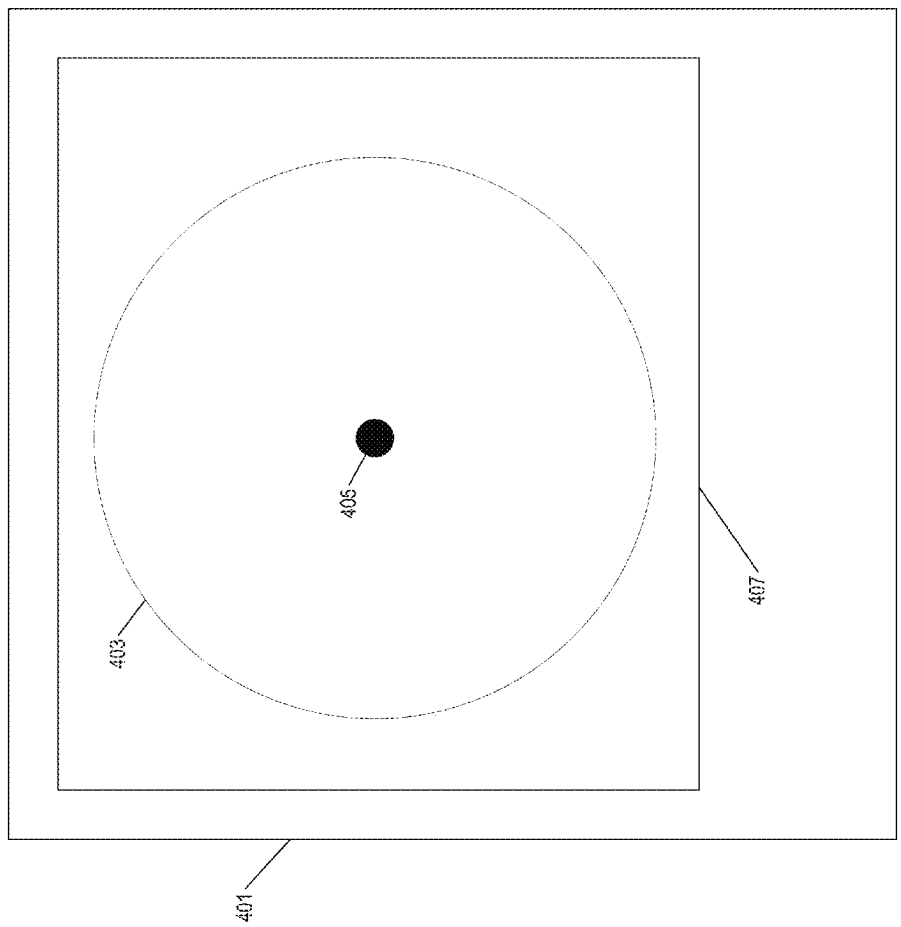

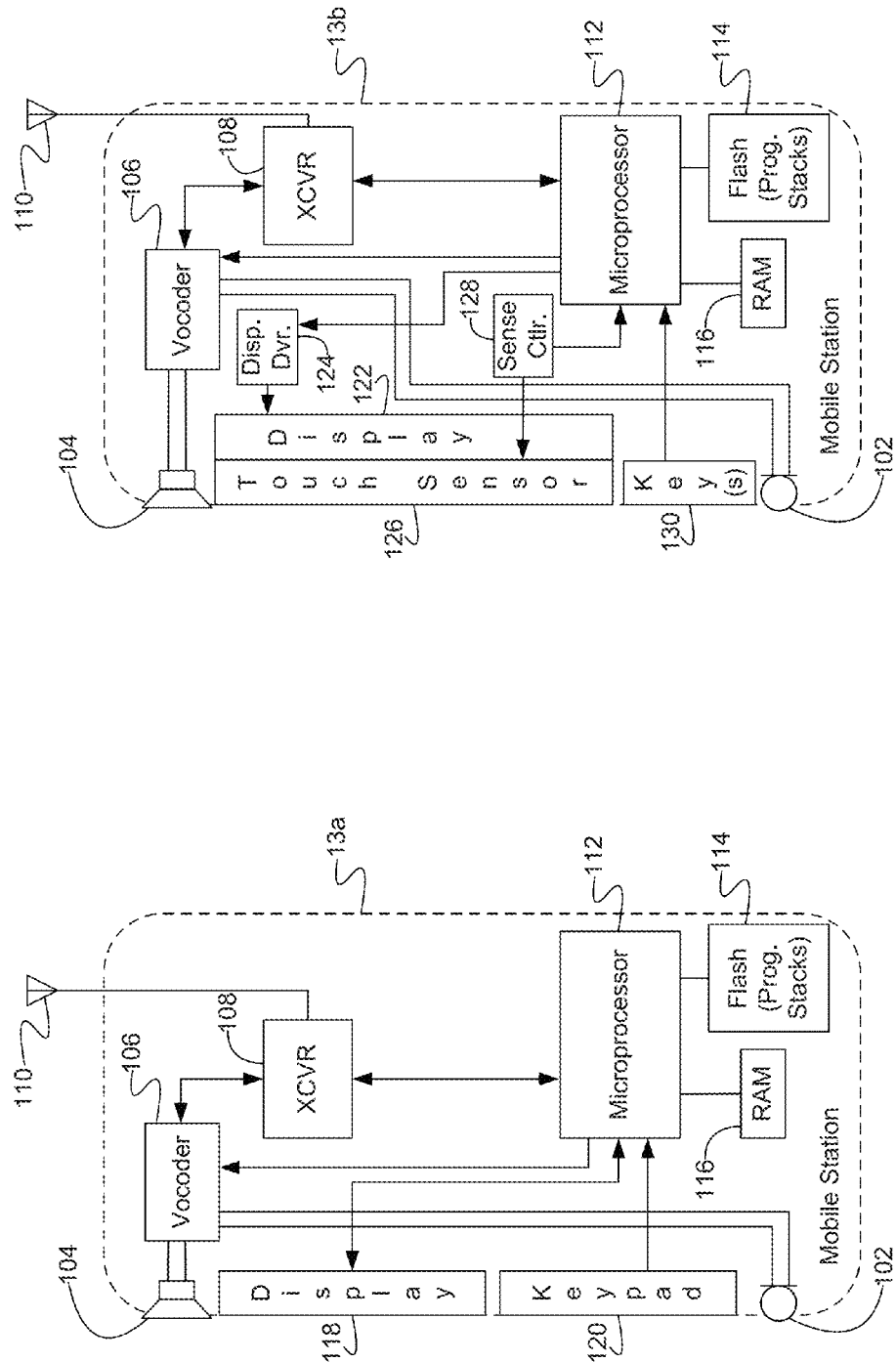

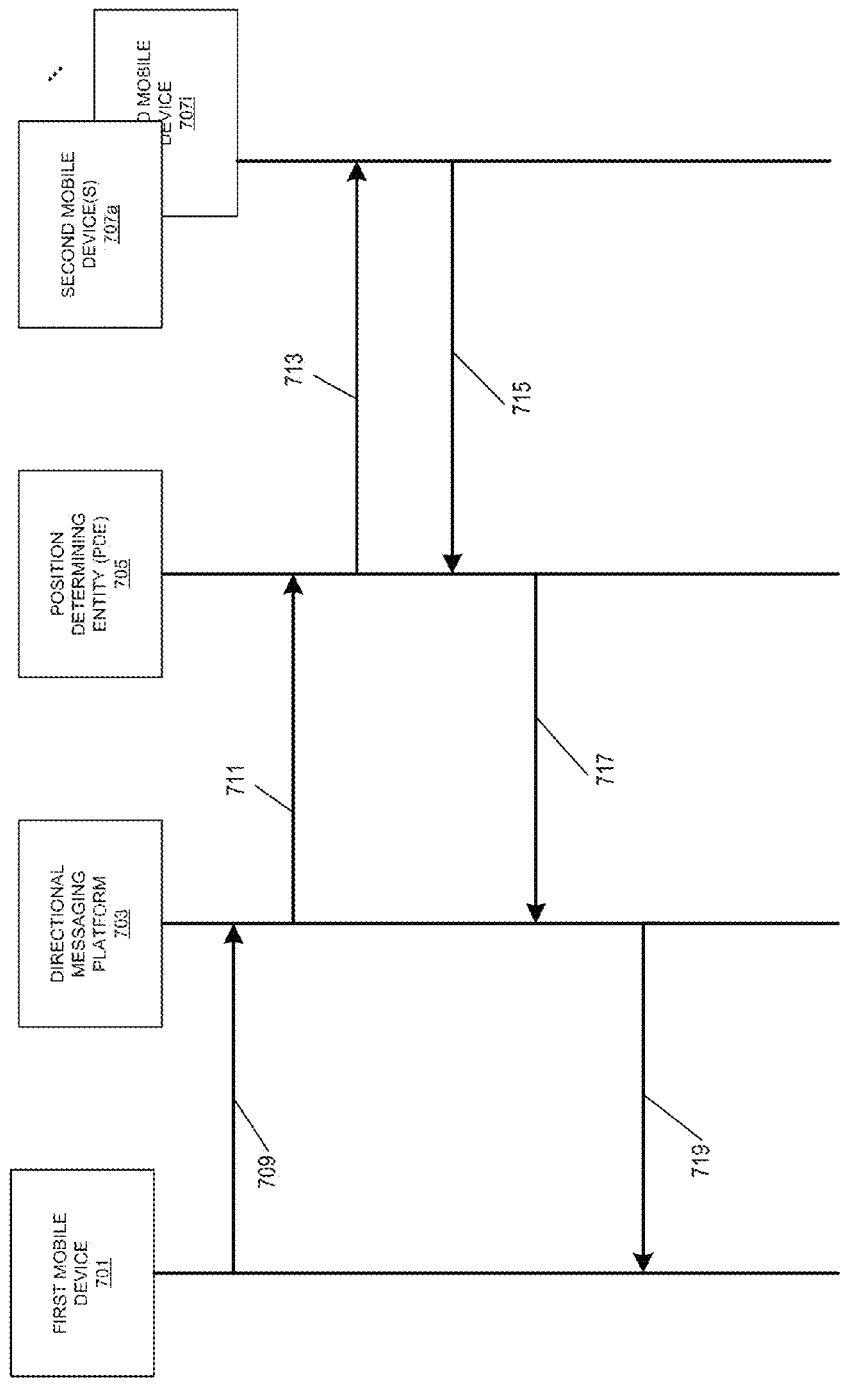

DIRECTIONAL MESSAGING AMONG MOBILE DEVICES

BACKGROUND

Mobile devices have the capability to send and receive messages such as, for example, text messages, emails, voice messages, etc., to other mobile devices and various other computing devices. Known technologies allow a user of a mobile device to send a message to a selected one or a group of devices. For example, the user can select one or more contacts from a contact list, or a list of Mobile Directory Numbers (MDN) to send a message to the selected group. However, using the known messaging systems the user is not able to select a group of contacts based on a condition such as, for example, current location of the contacts in the group or a geographical direction they are located at, with respect to the user. Therefore, a need exists for directional messaging among mobile devices.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4A-4C are exemplary screenshots provided by the directional messaging platform shown in FIG. 2.

FIG. 5 is a high-level functional block diagram of an exemplary non-touch type mobile device that may utilize the directional messaging service through a network/system like that shown in FIG. 1.

FIG. 6 is a high-level functional block diagram of an exemplary touch screen type mobile device that may utilize the directional messaging service through a network/system like that shown in FIG. 1.

FIG. 7 is a diagram of an exemplary process for determining location of mobile devices.

DETAILED DESCRIPTION

Figure 1:
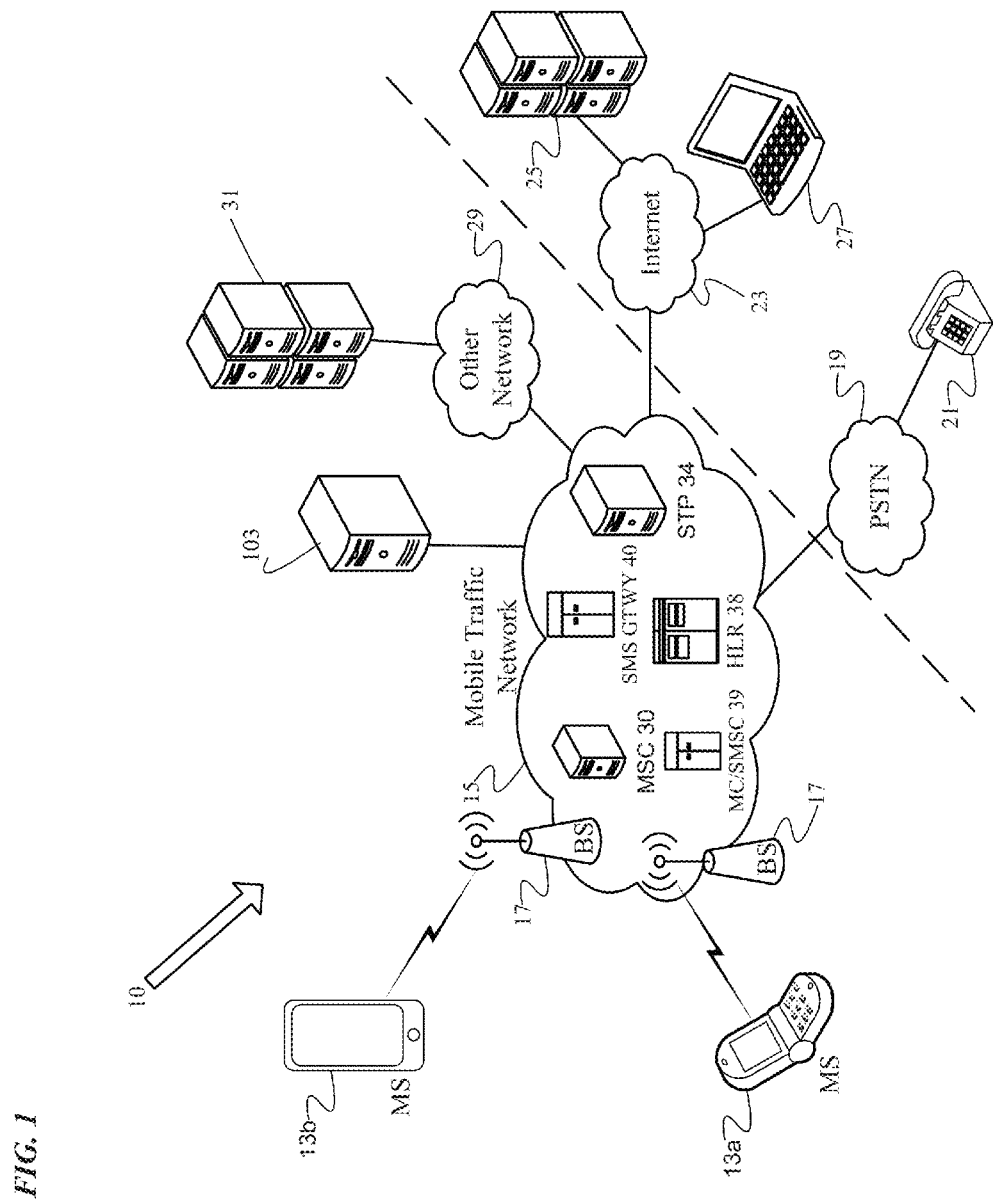
FIG. 1 is a high-level functional block diagram of an exemplary network that provides various communications for mobile devices and supports an example of the directional messaging service, according to one implementation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Sending messages via mobile devices is becoming one of the main communication methods among people, either for personal or professional exchanges. Contact lists and Mobile Directory Numbers (MDNs) allow a mobile user to send a message to a selected person or a group of people from a contact list. However, known messaging systems do not provide services for allowing the user to send messages to a group of people based on a condition such as, a current location of the mobile device, the current location of the group of people, etc. For example, a technician who is assigned a job located in a predetermined part of the city may realize that he is not able to reach the job location on time to provide the service. The technician may want to contact other technicians in the vicinity of the job location or in the vicinity of the technician's location to find out whether any of the technicians in the area are able to reach the service location on time to provide the service. Therefore, a service is needed to allow a user of a mobile device to send directional messages to other mobile devices, for example from an address book, that are located in a determined area.

In one implementation, a directional messaging platform is provided that allows a user of a mobile device (e.g., a sender) to send messages to other mobile devices (e.g., receivers) meeting a specific criterion. The specific criterion may include the receivers being located within an identified directional range or area. As used herein, a directional range can be a geographical range in a determined direction from an identified location. For example a directional range can be defined as "within m miles southwest of location A." For the purposes of determining range, a particular direction, such as Southwest, may have a predefined angular range, such as ±5° or ±10° from direct Southwest (e.g., if East=0° and North=90°, Southwest=235°). Alternatively, the criterion may include the receivers being located at a specific location or an area with respect to a destination. In yet another alternative, the criterion may include the receivers being located at a specific location or an area with respect to the sender, etc. In either case, to obtain location information on the receivers, the directional messaging platform may contact a server such as, for example a Positioning Determining Entity (PDE). The PDE may provide the directional messaging platform with location information of the potential receivers. The directional messaging platform may identify to the sender the locations of the receivers meeting one or more specific criterion (e.g., the receivers that are located within the identified directional range).

Reference now is made in detail to the examples illustrated in the accompanying drawings and discussed below. FIG. 1 is a high-level functional block diagram of an exemplary network 10 that provides various communications for mobile devices and supports an example of the directional messaging service by a directional messaging platform 103, according to one implementation. The directional messaging platform 103 can provide directional messaging for messaging services provided by application servers 31 or 25 to mobile devices 13a and 13b. The one or more messaging services can be provided by the application servers 31 and 25 to the mobile devices 13a and 13b and the user terminals 27. The example shows simply two mobile devices 13a and 13b as well as a mobile communication network 15. The stations 13a and 13b are examples of mobile devices that may be used for accessing the messaging services provided by the application servers 31 or 25 and the directional messaging services provided by the directional messaging platform 103. The application servers 31, 25 may be managed by the directional messaging platform 103. The directional messaging platform 103 can be located anywhere throughout the mobile communication network 10.

Although two mobile devices are shown, the network provides similar communications for other users as well as for mobile devices/users that may not participate in the services. The network 15 provides mobile wireless communications services to those stations as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless Internet Protocol (IP) network standard or the Evolution Data Optimized (EVDO) standard, the Global System for Mobile (GSM) communication standard, a time division multiple access (TDMA) standard or other standards used for public mobile wireless communications. The mobile devices 13a and 13b may be capable of voice telephone communications through the network 15, and for accessing applications and services provided by application servers 31 and 25 and the directional messaging platform 103. The exemplary devices 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls and messages to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13a and 13b via the Internet 23 may be with devices like those shown at 25 and 27 as well as with a variety of other types of devices or systems capable of data communications through various interconnected networks. The mobile devices 13a and 13b of users also can receive and execute applications written in various programming languages, as discussed in more detail below.

Mobile devices 13a and 13b can take the form of portable handsets, smart-phones or personal digital assistants, although they may be implemented in other form factors. Program applications, provided by the internet server 25 or the application server 31 to the mobile devices 13a, 13b and computing devices 27 can be configured to execute on many different types of mobile devices 13a and 13b. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 13a and 13b, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13a and 13b, when the mobile devices are within range. Each base station can include a BTS coupled to several antennae mounted on a radio tower within a coverage area often referred to as a "cell." The BTS is the part of the radio network that sends and receives Radio Frequency (RF) signals to/from the mobile devices 13a and 13b that are served by the base station 17.

The radio access networks can also include a traffic network represented generally by the cloud at 15, which carries the user communications and data for the mobile devices 13a and 13b between the base stations 17 and other elements with or through which the mobile devices communicate. In some examples, the mobile traffic network 15 includes network elements that support mobile station media content transfer services such as mobile switching centers (MSCs) 30 and signal transfer points (STP) 34. The network can also include other elements that support functionality other than device-to-device media transfer services such as messaging service messages and voice communications. Examples of other network elements that may be used in support of messaging service message communications include, but are not limited to, message centers (MCs) 39, home location registries (HLRs) 38, simple messaging service (SMS) gateway 40, and other network elements such as wireless internet gateways (WIGs), and visitor location registers (VLRs) (not shown). Other individual elements such as switches and/or routers forming the traffic network 15 are omitted here for simplicity. It will be understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile device and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile devices 13a or 13b, typically from/to an appropriate MC 39. The MSC 30 is sometimes referred to as a "switch." The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile devices and forwards the messages via the signaling resources and the signaling channels to the appropriate destination mobile devices. The MC 39 may receive messages from external devices for similar delivery to mobile devices, and the MC 39 may receive similar messages from mobile device 13a or 13b and forward them to servers or terminal devices, in either case, via an Internet Protocol (IP) packet data network.

In some examples, the MC 39 can also be considered or include functionality that may be considered that of a Short Messaging Service Message Center (SMSC) or a Message Register (MR). Wireless carriers developed the short message service (SMS) to transmit text messages for display on the mobile devices. In many existing network architectures, the SMS traffic uses the signaling portion of the network 15 to carry message traffic between a Short Message Service Center (SMSC) 39 and the mobile devices. The SMSC 39 supports mobile device to mobile device delivery of text messages. However, the SMSC 39 also supports communication of messages between the mobile devices and devices coupled to other networks. For example, the SMSC 39 may receive incoming IP message packets from the Internet 23 for delivery via the network 15, one of the base stations 17 and a signaling channel over the air link to a destination mobile device. For this later type of SMS related communications, the network 10 also includes one or more SMS gateways 40.

In other examples, the MC 39 includes functionality related to the Enhanced Messaging Service (EMS) or Multimedia Messaging service (MMS). An EMS message has special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile devices. In some examples, the MC 39 is considered in whole or in part a multimedia messaging service center (MMSC).

Although a single MC 39 is shown, a network 10 has geographically dispersed MCs 39. The MCs 39 includes destination routing tables (DRTs). In essence the DRTs are databases within the MCs 39. A DRT contains a list of the MDNs which are associated with the various MCs 39. For example, a first MDN is associated with a MC 39 in Minnesota while a second MDN is associated with a MC 39 in Virginia. The DRTs are used to determine which MC 39 should attempt to deliver an incoming messaging service message to the destination MDN. For example, if a user associated with the MC in Minnesota sends an SMS to a user associated with the MC 39 in Virginia, the Minnesota MC 39 sends the SMS to the Virginia MC 39 for delivery to the destination MDN. The communication among the MCs 39 occurs using known protocols such SMPP and the like.

The HLR 38, in some examples, stores a subscriber profile for each of the wireless subscribers and their associated mobile devices 13. The HLR 38 may reside in an MSC 30 or in a centralized service control point that communicates with the MSC(s) 30 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR 38 also tracks the current point of attachment of the mobile device to the network, e.g., the identification of the MSC 30 with which the mobile device is currently registered to receive service.

The visitor location register (VLR) (not shown) is, in some examples, a temporary database of the mobile devices that have roamed into the particular area which it serves. The VLRs for a region often are implemented in or in association with a MSC 30. Each base station 17 in the network is served by a single VLR, hence a subscriber cannot be present in more than one VLR at a time. The data stored in the VLR has either been received from the HLR 38, or collected from the mobile device.

The SMS gateway 40 provides functionality to transport messaging service messages to other mobile communication networks and also receive messaging service messages from other networks. The SMS gateway 40 may support communications using the SMPP protocol. SMS gateways 40 can be Short Message Peer-to-Peer gateways used to connect the wireless communication network (such as an Internal Protocol IP network on the left of the SMS Gateway 40 in FIG. 1) to another network (such as a public Internet network on the right of the SMS Gateway 40 in FIG. 1). The SMS Gateway 40 allows the MC 39 to receive and send messages in IP packet format. The SMS Gateway 40 is an entity within the wireless network 10 that acts as an intermediary between the wireless service provider network and other networks. For example, the SMS Gateway 40 converts messages in protocol(s) used by other applications and devices, e.g. Extensible Markup Language (XML), Hypertext Mail Protocol (HTMP), etc., to and from the short SMPP protocol. The SMPP messages may ride on IP transport, e.g., between the SMS Gateway 40 and the MC 39.

In addition, the traffic network portion 15 of the mobile communications network 10 connects to a private data network 29. The private data network 29 connects to the traffic network portion 15 via a gateway (not shown). The gateway provides protocol conversions between the protocols used by the traffic network 15 and the protocols used by the private data network 29.

The private data network 29 is in communication with various auxiliary services servers, e.g., such as those providing additional services to the users of the network 10, and/or to operations support personnel of the service provider or carrier that operates the network 10.

In an aspect private data network 29 is in communication with the directional messaging platform 103 and application servers 25 and 31. An application server 25 or 31 can include an enterprise application that manages messaging conversations or sessions. As an example, application server 25 or 31 may initiate transmission of messages to mobile devices 13a or 13b.

In an aspect, the directional messaging platform 103 allows application servers 25 or 31 and mobile devices 13a or 13b to uniquely identify short messages provided by a messaging application server 25 or 31 for purposes that include, but are not limited to, grouped display of short messages sharing a common conversation at mobile device 13a or 13b.

For example, in one aspect, directional messaging platform 103 receives from messaging application server 25 or 31 a messaging service message including a session ID and a phone number of a mobile device 13a or 13b configured to receive the messaging service message. Directional messaging platform 103 can then determine based on the session ID, whether the messaging service message is part of a new conversation or an existing conversation between messaging application server 25 or 31 and mobile device 13a or 13b. Then, based on the result of the determining step, directional messaging platform 103 can assign a particular code (e.g., long code) to the messaging service message. The particular code can allow mobile device 13a or 13b to group messaging service messages associated with a particular conversation together. This is because a recipients messaging application and/or message inbox may allow display of messages sharing a same long code (e.g., sender's phone number) as a conversational group or bunch.

Directional messaging platform 103 may then forward to a SMS gateway 40 the messaging service message along with the assigned particular code. At mobile device 13a or 13b, messages sharing a common conversation (or that may be a part of the same conversation) may be visually displayed as a bunch, compact group or any other visual grouping format. Such a grouped display may be present, for example, in a message inbox of a messaging application executing at mobile device 13a or 13b.

Those skilled in the art presumably are familiar with the structure, programming and operations of the various types of mobile devices. However, for completeness, it may be useful to consider the functional elements/aspects of two exemplary mobile devices 13a and 13b, at a high-level. While the present disclosure is discussed generally with reference to short messages and/or text messages it is to be appreciated that the disclosed implementations are not limited to short messages and/or text messages and can be applied to any form of messaging and communication, including, but not limited to, video, audio, multimedia or any combination thereof.

The carrier also operates a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31.

A mobile device 13a or 13b communicates over the air with a base station 17 and through the traffic network 15 for various voice and data communications, e.g. through the Internet 23 with a server 25 and/or with application servers 31. To insure that the application service offered by application servers 25 or 31 is available to only authorized devices/users, the provider of the application service may also deploy an authentication service. In addition, the provider of the application service may also deploy authentication services. The directional messaging platform 103 may be configured to allow a user of a mobile device 13a or 13b to send directional messages to other mobile devices. The directional messaging platform 103 can be a separate physical server as shown, or the directional messaging platform 103 can be implemented as another program module running on the same hardware platform as the application server 31 or 25. When the application server (servers 25 or 31 in our example) receives a service request from a client application on a mobile device 13a or 13b or a user terminal 27, the application server 25 or 31 provides appropriate information to the directional messaging platform 103. The directional messaging platform 103 uses the information provided by the application server 25 or 31 to communicate with the mobile device 13a or 13b or user terminal 27. Upon successful completion of the directional messaging process, the directional messaging platform 103 provides messaging reports to the application providers (e.g., application servers 31 or 25) via data communication through the various communication elements (e.g. 29, 15 and 17) of the network 10. The messaging services provided by the application servers 25 and 31 and the directional messaging platform 103 may be provided via the server 31 or 25, if there is an appropriate arrangement between the carrier and the operator of server 31 or 25, by a program on the server 31 or 25 or via a separate authentication server (not shown) connected to the Internet 23 or the network 29.

Servers such as 25 and 31 may provide any of a variety of common application or service functions in support of or in addition to an application program running on the mobile device 13a, 13b, or a user terminal 27. However, for purposes of further discussion, we will focus on functions thereof in support of the directional messaging service. For a given service, including the directional messaging service, an application program within the mobile device may be considered as a 'client application' and the programming at 103, 25 or 31 may be considered as the 'server' application for the particular service.

Figure 2:
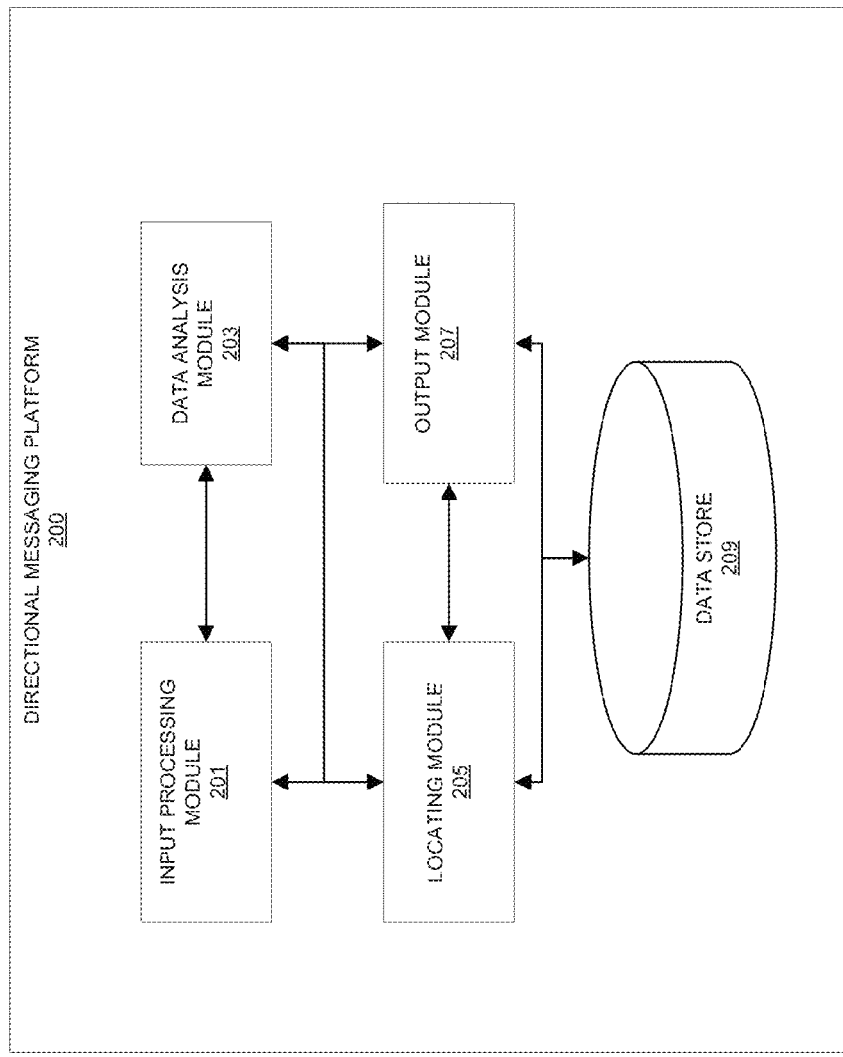
FIG. 2 is a schematic illustration of a directional messaging platform, according to an implementation.

FIG. 2 is a schematic illustration of a directional messaging platform, according to an implementation. The directional messaging platform 200 can be similar to the directional messaging platform 103 of FIG. 1. As previously discussed, the directional messaging platform 103 can be located anywhere throughout the mobile communication network 10. In some aspects, the directional messaging platform 103 or one or more modules of the directional messaging platform 103 can be located within a mobile device 13a or 13b or a user terminal 27. As shown in FIG. 2, the directional messaging platform 200 may include an input processing module 201, a data analysis module 203, a locating module 205, an output module 207, and a data store 209. As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The directional messaging platform 200 can provide directional messaging to a mobile device 13a and 13b as a stand-alone service or as an additional service to applications provided by the application servers 31 and 25 for the mobile devices 13a and 13b and the user terminals 27. In some instances, the input processing module 201 receives an input from a first mobile device 13a identifying a directional range for sending a message to a second mobile device 13b (e.g., a target mobile device) within the directional range. For example, a user of the mobile device 13a may enter a directional range with regards to a current location of the mobile device 13a (e.g., Southeast, Northwest, etc.) in an input field. Alternatively, a screen displayed on a display unit of the mobile device 13a by the directional messaging platform 200 may show the current location of the mobile device 13a and an area surrounding the mobile device 13a (e.g., a circular, rectangular, triangular, arc-shaped, etc. area) around the current location. In such instances, the user may select a range on the screen by touching the display (e.g., dragging, pinching, etc.), by using a stylus on the display, etc. In addition, the user may select a direction by a gesture such as, for example, touching a location on the screen as a base-location and pulling on the screen in a desired direction or by, after activating the directional messaging application, gesturing with the entire mobile device 13a (e.g., flicking the mobile device 13a) in the desired direction. The input processing module 201 may store the input in data store 209.

Upon receiving the input, the data analysis module 203 can identify one or more mobile devices (e.g., mobile device 13b) located in the directional range identified in the user input, to be presented to the first mobile device as the target mobile device. For example, the data analysis module 203 may search a contact list associated with the first mobile device for the target mobile device in the directional range. The data analysis module 203 may send the contact list and the input data to the locating module 205. The locating module 205 can locate the mobile devices in the contact list and send location information of the contact list mobile devices to the data analysis module 203. The locating module 205 may obtain the location information from the PDE accessible to the directional messaging platform 200 via the communication network 15. The data analysis module 203 may store data associated with the identified target mobile devices such as, for example, a current location of the target mobile device, an indicator for each of the located mobile devices, etc., in data store 209.

Upon locating one or more target mobile devices within the directional range by the data analysis module 203, the data analysis module 203 can send one or more location indicators associated with the located target mobile devices to the output module 207. The output module 207 can send the one or more location indicators, showing the location of the target mobile device 13a or 13b within the identified directional range, to the first mobile device 13a or 13b. For example, one or more indicators of the target mobile device may be displayed on the screen of the display unit of the first mobile device 13a or 13b by the output module 207.

The user of the first mobile device 13a or 13b may select one or more of the target mobile device indicators, for example by clicking on the indicators or touching the indicators on the screen, indicating a request to send a message to the mobile devices associated with the selected indicators. Alternatively, the user of the first mobile device 13a or 13b may wish to send a message to all of the target mobile devices. As another alternative, the directional messaging platform 200 may automatically send a message to all or a subset of the target mobile devices. The directional messaging system 200 may provide a setup process such that a pre-determined setup can be defined for sending a message. For example, the pre-determined setup may indicate sending a message to first n target devices closest to (or farthest from) the current location of the first mobile device. In such instances, the user can be provided a button on the screen to send a message to all the located target mobile devices. The input processing module 201 can receive the user's message from the first mobile device to send to the selected target mobile devices located within the identified directional range. The input processing module 201 may store the received user selection in data store 209.

The input processing module 201 can send the user's message to output module 207 and the output module 207 can send the message to the selected one or more target mobile devices in response to receiving the message. In some instances, the output module 207 can send the message received from the first mobile device to another messaging server (not shown in FIG. 1) such that the messaging server can send the message to the selected target mobile devices 13a or 13b. The output module 207 may store the message and a list of target mobile devices that the message is sent to, in data store 209.

Figure 3:
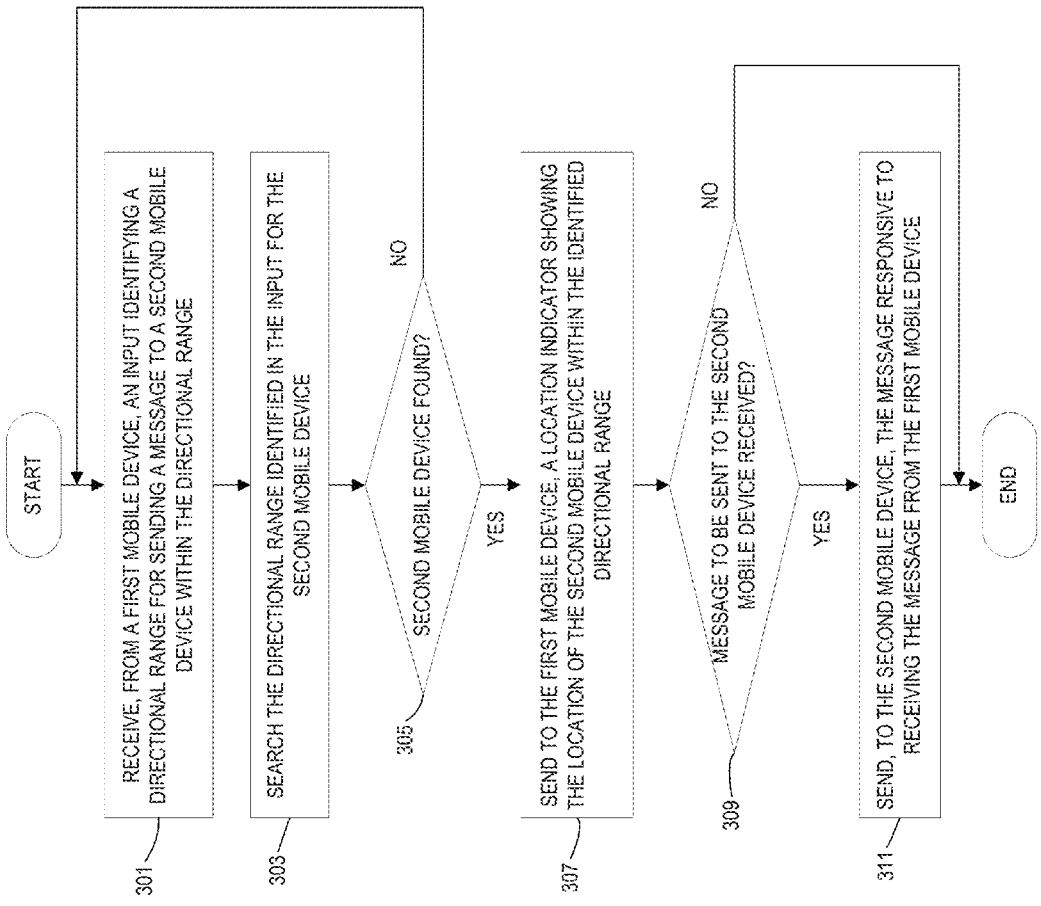
FIG. 3 is an exemplary process for providing directional messaging service.

FIG. 3 is an exemplary process for providing directional messaging service. Although FIG. 3 is described with reference to FIGS. 1 and 2, the subject technology is not limited to such and can apply to other computing devices and systems. At block 301 the input processing module 201 of the directional messaging platform 200 receives an input from a first mobile device 13a or 13b identifying a directional range for sending a message to a target mobile device 13a or 13b within the directional range. The input may include a base-location and a directional range from the base-location. The base-location may be an address, a location of interest, the first mobile device's current location, etc., and the directional range may be a range within a specified distance from the base-location in a specified direction, a circular range around the base-location, etc. For example, a user of the first mobile device may be a technician assigned a time sensitive job in an area in town which is located to the Southeast of his current location within a distance of D1. The user may be unable to reach the job location on time to complete the job. In this case, the user may want to find other technicians in the area (e.g., on his South East) within a reachable distance from the job location to be able to take over the job and reach the location on time. The user can send a request to the directional messaging platform 200 identifying a directional range such as, for example within distance D2 from his current location to the Southeast.

At block 303 the data analysis module 203 can identify a target mobile device located in the directional range identified in the user input. For example, the data analysis module 203 can analyze the user input to determine an area that satisfies the condition given in user input of Southeast of the current location of the first mobile device and within distance D2. The data analysis module 203 may receive a group contact list from the first mobile device that includes a set of Mobile Directory Numbers (MDNs). For example, the MDNs may be a corporation library of an employer of the technician including mobile numbers of all the technicians employed by the employer. In some instances, the group contact list associated with the user of the first mobile device may be stored in data store 209 or in another network location associated with the user such as, for example, a cloud space of the user within network 10 of FIG. 1. In such instances, the input processing module 201 may download the group contact list from the network before sending the list to the data analysis module 203. The data analysis module 203 may receive the list directly from the first mobile device 13a or 13b of the user, from another mobile device 13a or 13b or user terminal 27 associated with the employer, or from another location throughout the network of FIG. 1 accessible to the directional messaging platform 200 via the communication network 15. The data analysis module 203 may send the user request and the contact list to a locating module 205 such that the locating module 205 can search the directional range identified in user input for a target mobile device from the contact list. The locating module 205 can identify a location associated with each MDN listed in the group contact list and save the identified locations in data store 209. For example, the locating module 205 can send a message to each mobile device in the MDN list via the output module 207 requesting location data associated with the MDN. In other instances, the locating module 205 may request a PDE for location information of the mobile devices. The input module 201 can receive the location data associated with each MDN in response to the requests and store the location data in data store 209.

Upon receiving the location data, the locating module 205 can determine whether the identified location associated with at least one of the MDNs listed in the group contact list falls within the identified directional range given in user input. The locating module may search for one or more target mobile devices within the identified directional range. In various instances, the search may be stopped after a specified number of target mobile devices are found. Upon determining that at least one of the MDNs listed in the group contact list falls within the identified directional range, the locating module 205 identifies a mobile device associated with the at least one MDN as the target mobile device. At block 305, the locating module 205 can send data associated with the identified target mobile devices to the output module 207.

At block 307, the output module 207 sends one or more location indicators to the first mobile device 13a or 13b showing the locations of the target mobile devices within the identified directional range. For example, the technician may be presented with one or more indicators on a screen of his mobile device showing current locations of one or more mobile devices associated with other technicians from his contact list which are currently within the directional range that he had initially indicated.

At block 309, the input processing module 201 may receive a message from the user of the first mobile device to be sent to at least one of the target mobile devices located within the identified directional range. For example, the user may select one or more of the indicators displayed on his mobile device screen and a message to be sent to the selected one or more target mobile devices. At block 311, the output module 207 sends the message to each of the one or more target mobile devices selected by the user of the first mobile device responsive to receiving the message from the first mobile device.

The message sent to the target mobile devices may be a message provided by the user as input, a predefined message provided by the output module 207, or a combination thereof. In some exemplary instances, the data store 209 of the directional messaging platform 200 may include a set of predefined messages associated with various statuses. The predefined messages may have been defined by the user, by an administrator, etc. In such instances, upon receiving a request from the first mobile device, the output module 207 may present a list of available predefined messages to the user, via the first mobile device, such that the user can select a message to be sent to a selected set of target mobile devices (the target mobile devices selected by the user or by the directional messaging platform 200 as discussed above). The user can select different messages to be sent to different target mobile devices. For example, the user may select a target mobile device from a first list and select a message to be sent to the selected target mobile device from another list. Upon completion of selection by the user, the output module 207 may send the messages to the target mobile devices simultaneously.

Alternatively, the directional messaging platform 200 may enable the user to provide messages to be sent to the target mobile devices. In addition, a message can be an email, a text message such as, for example, a short messages, an enhanced message, or a multimedia message, a video message, a voice message, an alert, or a combination thereof. The user may select predefined messages for some target mobile devices and type his/her own messages for some other target mobile devices. The user may also select a predefined message for a target mobile device and modify the message by adding content to or deleting content from the message before sending. The user may select and prepare all messages to be sent to the target mobile devices and send all messages simultaneously by pressing a button provided by the directional messaging platform 200 on the first mobile device (e.g., on a screen). Upon pressing the button by the user, the directional messaging platform 200 can receive the messages from the first mobile device and send out the messages to the selected target mobile devices, simultaneously.

As previously discussed, the data analysis module 203 may identify one mobile device or multiple mobile devices as the target mobile device. When the data analysis module 203 identifies multiple target mobile devices, multiple location indicators are sent by the output module 207 to the first mobile device showing the locations of the multiple target mobile devices within the identified directional range. Similarly, the directional messaging platform 200 may receive a message from the first mobile device to send to each of the multiple identified target mobile devices located within the identified directional range. In such cases, the output module 207 sends the message to each of the multiple target mobile devices responsive to receiving the message from the first mobile device. In other variations, as previously discussed, the output module 207 may simultaneously send different messages to each of the target mobile devices, for example based on a selection by the user.

In some instances, the user of the first mobile device may select a subset of the identified target mobile devices to which to send a message. For example, the output module 207 may display a list of identified target mobile devices on a user interface of the first mobile device and enable the user to select a subset by clicking, by dragging and dropping, etc. The list may also include other information associated with the target mobile devices such as, for example, current location, owner's name, etc. The list may be presented to the user on a map displayed on the first mobile device such that the user can select a subset of target mobile devices based on their location for example by clicking on an icon representing each target mobile device, by dragging and dropping the icons, etc. In such instances, the input device 201 may receive a message from the first mobile device to be sent to a subset of the multiple identified target mobile devices associated with a subset of the multiple location indicators provided to the user. Subsequently, the output module 207 sends the message to the subset of the multiple target mobile devices, as selected by the user.

In some instances, a set of messages may be received from the first mobile device 13a or 13b to be sent to multiple second mobile devices 13a or 13b. The set of messages may include different messages for different second mobile devices. For example, the user of the first mobile device may wish to send different messages to different people based on their relation, degree of acquaintance, work responsibilities of each person, etc. In such instances, the output module 207 can simultaneously send messages to each of the second mobile devices such that at least two of the second mobile devices each receive a different message of the set of messages.

In some instances, when the input received from the first mobile device includes a base-location and a directional range from the base-location, the data analysis module 203 may provide data associated with an area surrounding the base-location for the first mobile device, such that the area includes the directional range within the area. For example, if the user input includes an address as a base-location and a Northwest direction, the data analysis module 203 may provide data associated with target mobile devices within a circular, rectangular, triangular, arc-shaped etc., area surrounding the address provided by the first mobile device. The data analysis module 203 may use a predefined value as a radius or length of the area, use a value provided by the user, or a combination thereof. For example, the data analysis module 203 may provide a circular area with the address in the center and a radius of 5 miles, or a triangular area stretched from the address towards the Northwest direction with the address on a vertex of the triangle such that the edges of the triangle cover a 5 mile distance from the base-location address. The data analysis module 203 may send the provided data to the output module 207. The output module 207 can display the base-location and the area surrounding the base-location on a screen of the first mobile device. The screen can be a touch screen and the user can be allowed to select the directional range by touching the screen. For example, the user may wish to extend the area from a 5 mile radius to a 10 mile radius or shrink the area to a 2 mile radius by entering a number in an input field or by grabbing and pinching the area displayed on the screen.

Figure 4B:
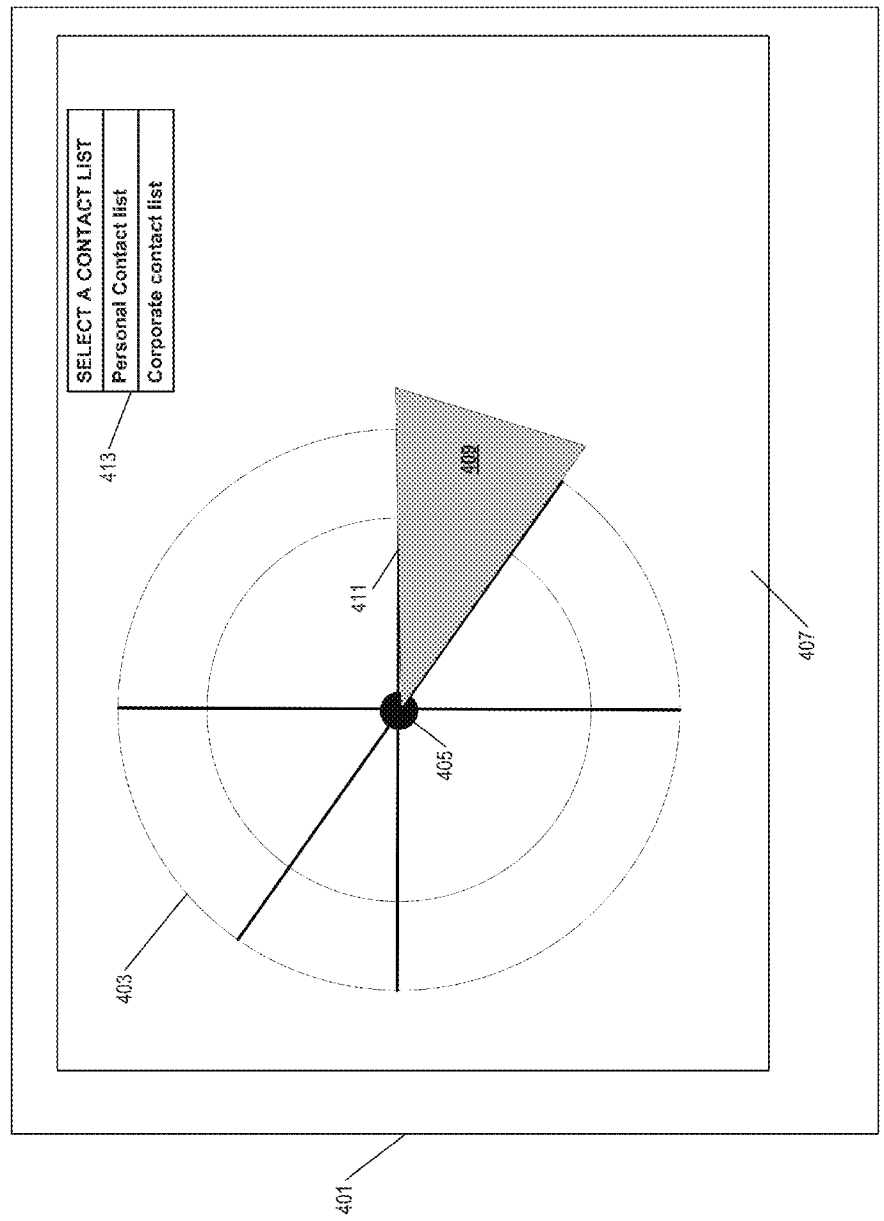
Figure 4C:
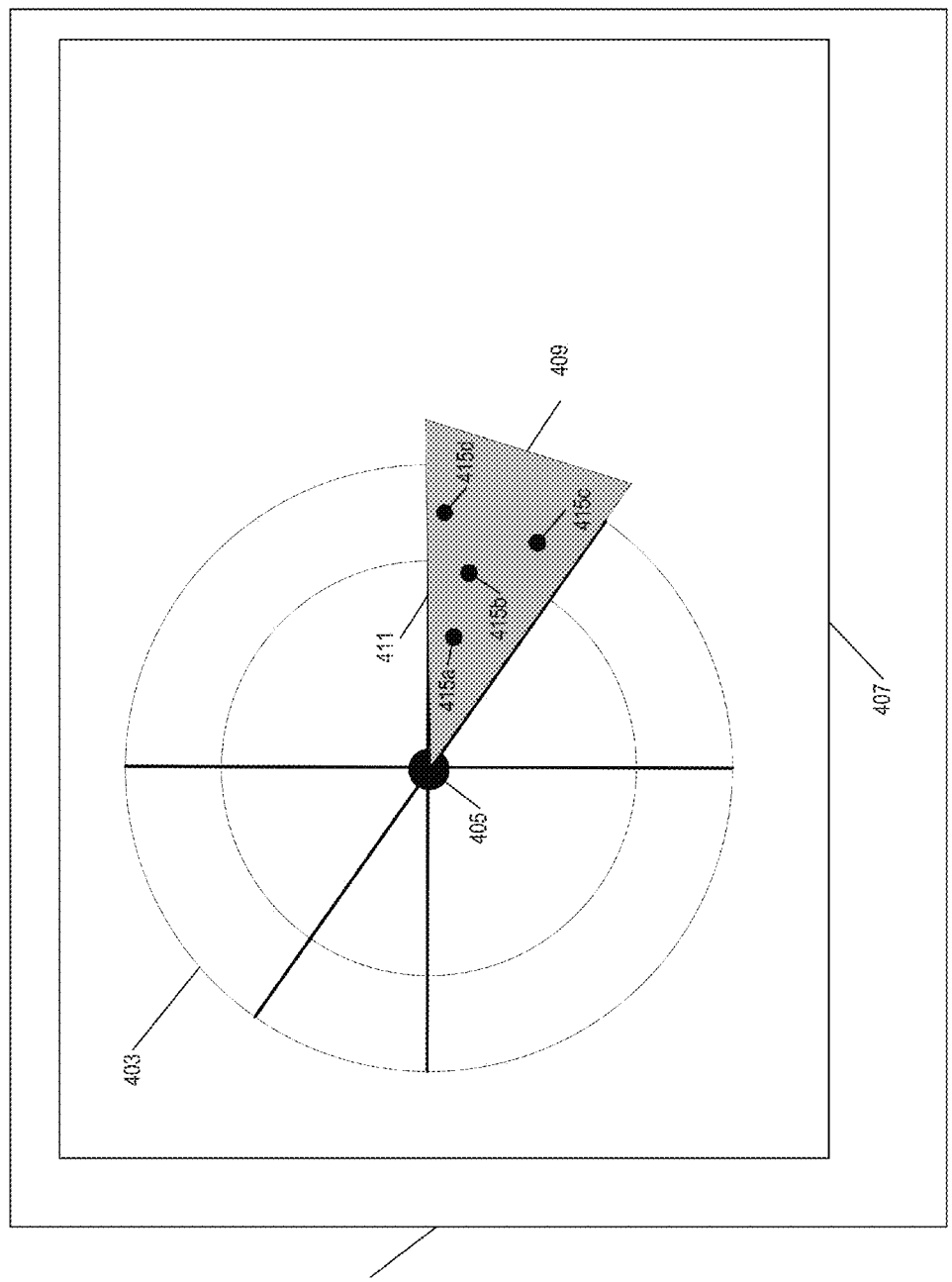

FIGS. 4A-4C are exemplary screenshots provided by the directional messaging platform shown in FIG. 2. In various aspects, a user of a mobile device 401 (similar to the mobile devices 13a or 13b of FIG. 1) can request a directional messaging service from the directional messaging platform 200, for example, by selecting an icon or pressing a button (not shown) on the mobile device 401. The user selection may start an application on the mobile device 401 to communicate with the directional messaging platform 200. In response to the user input, the directional messaging platform 200 may display screen 407 on a user interface of the mobile device 401, showing a current location 405 of the user, and ask the user to input a directional range for sending a message to a second mobile device within the directional range. For example, the input received at the directional messaging platform 200 from the mobile device 401 may include a circular range 403 surrounding a current location 405 of the mobile device as a base-location. The user is also allowed to select a different base-location, for example, by entering an address. The user of mobile device 401 may identify the input area 403 by dragging a touch screen surface of screen 407 of the mobile device 401. In the example of FIG. 4B, the input provided by the user of mobile device 401 includes a base-location 405 and a directional range 409 to the East and South of the current location 405 for a stretch value 411 (e.g., 5 miles). The user input may also include a group contact list 413 including a personal contact list of the user, a corporate contact list, for example of the user's employer, etc., where each list includes Mobile Directory Numbers (MDNs) associated with other mobile devices.

Upon analysis of the input data by the data analysis module 203 and locating of the mobile devices by the locating module 205 based on the input data, the directional messaging platform 200 can identify one or more mobile devices located in the directional range identified in the input. The output module 207 of the directional messaging platform 200 can display the identified mobile devices on screen 407 of the mobile device 401. As shown in FIG. 4C, the identified mobile devices 415a-415d are displayed on screen 407 of mobile device 401.

The user of the mobile device 401 can select one or more identified mobile devices 415a-415d and request the directional messaging platform 200 for a message to be sent to the selected mobile devices 415a-415d as previously discussed with respect to FIGS. 2 and 3.

Those skilled in the art presumably are familiar with the structure, programming and operations of the various types of mobile devices. However, for completeness, it may be useful to consider the functional elements/aspects of two exemplary mobile devices 13a and 13b, at a high-level.

For purposes of such a discussion, FIG. 5 provides a high-level functional block diagram of an exemplary non-touch type mobile device that may utilize the directional messaging service through a network/system like that shown in FIG. 1. FIG. 5 provides a block diagram illustration of an exemplary non-touch type mobile device 13a. Although the mobile device 13a may be a smart-phone or may be incorporated into another device, such as a personal digital assistant (PDA) or the like, for discussion purposes, the illustration shows the mobile device 13a is in the form of a handset. The handset implementation of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass implementations of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during directional messaging process. For example, if used for directional messaging provided by a directional messaging platform 200 or requesting the directional messaging service to applications.

A microprocessor 112 serves as a programmable controller for the mobile device 13a, in that it controls all operations of the mobile device 13a in accord with programming that it executes, for all normal operations, and for operations involved in the directional messaging procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for providing directional messaging services. For example, any of the modules of the directional messaging platform 200 or any parts of the modules can be located on the mobile device 13a or 13b.

For purposes of such a discussion, FIG. 6 provides a high-level functional block diagram of an exemplary touch screen type mobile device that may utilize the directional messaging service through a network/system like that shown in FIG. 1. FIG. 6 provides a block diagram illustration of an exemplary touch screen type mobile device 13b. Although possible configured somewhat differently, at least logically, a number of the elements of the exemplary touch screen type mobile device 13b are similar to the elements of mobile device 13a, and are identified by like reference numbers in FIG. 6. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass implementations of the mobile device 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile device 13b, in that it controls all operations of the mobile device 13b in accord with programming that it executes, for all normal operations, and for operations involved in the directional messaging procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, outlined above, the mobile device 13b includes a processor, and programming stored in the flash memory 114 configures the processor so that the mobile device is capable of performing various desired functions, including in this case the functions involved in the technique for providing directional messaging service.

In the example of FIG. 5, the user interface elements included a display and a keypad. The mobile device 13b may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary mobile device 13b includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output, including with respect to some directional messaging related functions.

The structure and operation of the mobile devices 13a and 13b, as outlined above, were described by way of example, only. As shown by the above discussion, functions relating to the directional messaging service, via a graphical user interface of a mobile device may be implemented on computers connected for data communication via the components of a packet data network, operating as shown in FIG. 1. Although special purpose devices may be used, such devices also may be implemented using one or more hardware platforms intended to represent a general class of data processing device commonly used to run "server" programming so as to implement the directional messaging functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for directional messaging service. The software code is executable by the general-purpose computer that functions as the directional messaging platform and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for directional messaging service, in essentially the manner performed in the implementations discussed and illustrated herein.

FIG. 7 is a diagram of an exemplary process for determining location of mobile devices. According to some aspects, as discussed with regards to block 301 of FIG. 3 and also FIGS. 4A and 4B, the directional messaging platform 200 receives user input from a mobile device 13a or 13b identifying a directional range for sending a message to a target mobile device within the directional range. Upon receiving the user input, the directional messaging platform 200 identifies one or more mobile devices as the target mobile device located in the directional range identified in the input, as discussed with regards to block 303 of FIG. 3. FIG. 7 shows a process for identifying the target mobile device. As shown in FIG. 7, at step 709 the first mobile device 701 (similar to the mobile device 13a or 13b) sends the input to the directional messaging platform 703 (similar to the directional messaging platform 200 of FIG. 2). The directional messaging platform 703 receives user input and provides a location request based on the user input. The location request may include a base-location, a directional range, and a list of MDNs provided by the user of the first mobile device 701 as previously discussed with regards to FIG. 4B (the contact list 413). At step 711 the directional messaging platform 703 sends the location request to a position determining entity (PDE) 705. The PDE 705 may be located at any location throughout the network of FIG. 1 and accessible to the directional messaging platform 703 via the communication network 15 of FIG. 1. The PDE 705 may locate one or more target mobile devices 707a-707i from the MDN list using various locating methods. For example, at step 713 the PDE 705 may send a location request (e.g., a signal) to all of the contacts in the MDN list provided by the user of first mobile device. At step 715, the PDE 705 receives location data provided by each target mobile device 707a-707i. At step 717, the PDE 705 sends a list of locations of the target mobile devices 707a-707i to the directional messaging platform 703.

Upon receiving the locations of the target mobile devices 707a-707i from the PDE 705, the directional messaging platform 703 identifies one or more target mobile devices 707a-707i that fall within the directional range given in user input. At step 719, the directional messaging platform 703 sends one or more location indicators showing the location of the one or more target mobile devices from the mobile devices 707a-707i that are within the identified directional range to the first mobile device 701, as discussed with regards to block 307 of FIG. 3.

Figures 8, 9:
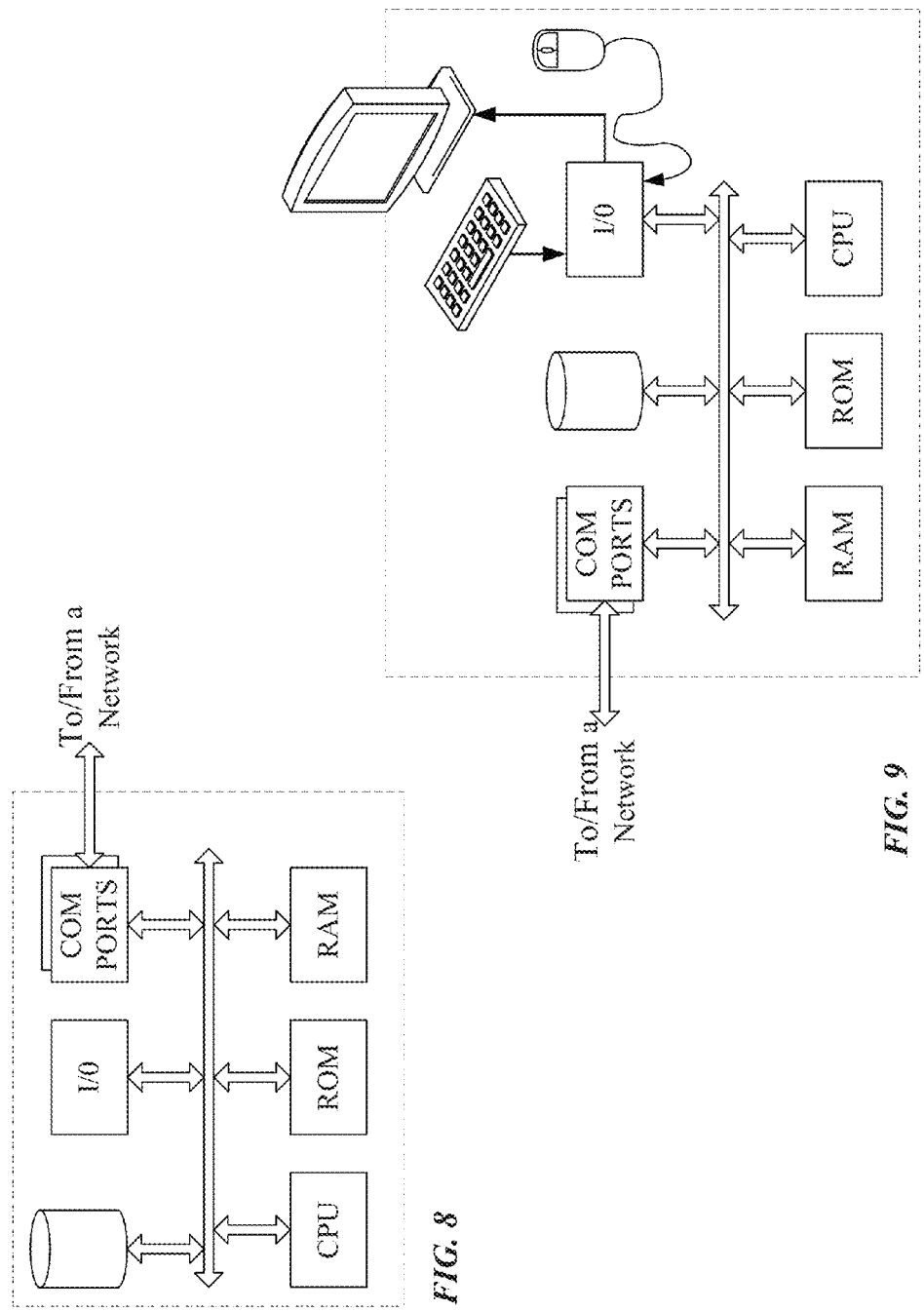
FIG. 8 is a simplified functional block diagram of an exemplary computer that may be configured as a host or server.
FIG. 9 is a simplified functional block diagram of an exemplary personal computer or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of providing directional messaging services outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the directional messaging platform 200 into the computer platform of the application server 25 that will be the application server for the mobile devices 13a, and 13b or the user terminal 27. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the directional messaging service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

Many of the above described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described herein is within the scope of the invention. In some implementations, the software programs, when installed to operate on one or more electronic systems, define one or more specific machine implementations that execute and perform the operations of the software programs.

A computer program (also known as a program, software, software application, script, application, or code) can be written in any form of programming language, including compiled or interpreted language, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed herein is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The implementations described hereinabove are further intended to explain and enable others skilled in the art to utilize the invention in such, or other, implementations and with the various modifications required by the particular applications or uses of the invention. Accordingly, the description is not intended to limit the invention to the form disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A method comprising:
   receiving, at a server and from a first mobile device, an input identifying a directional range;
   identifying, at the server, a second mobile device located in the directional range identified in the input;
   sending, from the server and to the first mobile device, a location indicator, wherein the location indicator provides sufficient information about a location of the second mobile device, to enable the first mobile device to display the location of the second mobile device on a map;
   upon sending the location indicator to the first mobile device, receiving, from the first mobile device and at the server, a text message to be sent to the second mobile device; and
   in response to receiving the text message, sending the text message from the server to the second mobile device.

2. The method of claim 1, wherein identifying the second mobile device includes:
   receiving, at the server, a group contact list associated with the first mobile device including a plurality of Mobile Directory Numbers (MDNs);
   identifying a location associated with each MDN in the group contact list;
   determining whether the identified location associated with at least one of the MDNs in the group contact list falls within the identified directional range; and
   upon determining that at least one of the MDNs listed in the group contact list falls within the identified directional range, identifying a mobile device associated with the at least one MDN as the second mobile device.

3. The method of claim 2, wherein the group contact list is received, at the server, from the first mobile device, from a memory location within the server, from another server, or a combination thereof.

4. The method of claim 2, wherein identifying the location associated with each MDN in the group contact list includes:
   sending a message to each MDN in the group contact list requesting location data associated with the MDN; and
   receiving the location data from the each MDN.

5. The method of claim 1, wherein:
   identifying the second mobile device includes identifying a plurality of mobile devices,
   sending the location indicator includes sending a plurality of location indicators to the first mobile device, the plurality of location indicators providing sufficient information about locations of each of the plurality of mobile devices to enable the first mobile device to display the locations on a map,
   receiving the text message to be sent to the second mobile device includes receiving at least one text message to be sent to the plurality of mobile devices, and
   sending the text message includes sending the at least one text message to the plurality of mobile devices.

6. The method of claim 5, wherein:
   receiving the at least one text message to be sent to the plurality of second mobile devices includes receiving a plurality of text messages to be sent to the plurality of mobile devices, and
   sending the text message includes simultaneously sending the plurality of text messages to the plurality of mobile devices such that at least two of the plurality of mobile devices each receives a different text message of the plurality of text messages.

7. The method of claim 5 wherein:
   receiving the at least one text message to be sent to the plurality of mobile devices includes receiving at least one text message to be sent to a subset of the plurality of mobile devices associated with a subset of the plurality of location indicators, wherein the subset of the plurality of mobile devices is selected by a user of the first mobile device, and sending the text message includes sending the at least one text message to the subset of the plurality of mobile devices.

8. The method of claim 1, wherein the input includes a base-location and the directional range from the base-location, the method further comprising:
providing data associated with an area surrounding the base-location to the first mobile device, wherein the directional range is a part of the area surrounding the base-location selected by a user of the first mobile device.

9. The method of claim 8, wherein a radius of the area surrounding the base-location is determined based on a selection by the user of the first mobile device, based on a preset value, or a combination thereof.

10. The method of claim 8, wherein the base-location is a current location of the first mobile device.

11. The method of claim 1, wherein the input identifying the directional range includes a reference to one or more cardinal directions or combinations thereof.

12. The method of claim 1, wherein the input identifying the directional range includes moving the first mobile device in a desired direction.

13. A server comprising:
a processing device; and
a memory storing executable instructions for causing the processing device to:
  receive, at the server and from a first mobile device, an input identifying a directional range;
  identify, at the server, a second mobile device located in the directional range identified in the input;
  send, from the server and to the first mobile device, a location indicator, wherein the location indicator provides sufficient information about a location of the second mobile device, to enable the first mobile device to display the location of the second mobile device on a map;
  upon sending the location indicator to the first mobile device, receive, from the first mobile device and at the server, a text message to be sent to the second mobile device; and
  in response to receiving the text message, send the text message from the server to the second mobile device.

14. The server of claim 13, wherein the instructions causing the processing device to identify the second mobile device further include instructions to cause the processing device to:
  receive, at the server, a group contact list associated with the first mobile device including a plurality of Mobile Directory Numbers (MDNs);
  identify a location associated with each MDN in the group contact list;
  determine whether the identified location associated with at least one of the MDNs in the group contact list falls within the identified directional range; and
  upon determining that at least one of the MDNs listed in the group contact list falls within the identified directional range, identify a mobile device associated with the at least one MDN as the second mobile device.

15. The server of claim 13, wherein:
the instructions causing the processing device to identify the second mobile device further include instructions to cause the processing device to identify a plurality of mobile devices,
the instructions causing the processing device to send the location indicator further include instructions to cause the processing device to send a plurality of location indicators to the first mobile device, the plurality of location indicators providing sufficient information about locations of the plurality of mobile devices to enable the first mobile device to display the locations on a map,
the instructions causing the processing device to receive the text message to be sent to the second mobile device further include instructions to cause the processing device to receive at least one text message to be sent to the plurality of mobile devices, and
the instructions causing the processing device to send the at least one text message further include instructions to cause the processing device to send the at least one text message to the plurality of mobile devices.

16. The server of claim 15, wherein:
the instructions causing the processing device to receive the at least one text message to be sent to the plurality of mobile devices further include instructions to cause the processing device to receive at least one text message to be sent to a subset of the plurality of mobile devices associated with a subset of the plurality of location indicators, wherein the subset of the plurality of mobile devices is selected by a user of the first mobile device, and
the instructions causing the processing device to send the at least one text message further include instructions to cause the processing device to send the at least one text message to the subset of the plurality of mobile devices.

17. The server of claim 13, wherein the input includes a base-location and the directional range from the base-location, and wherein the instructions further include instructions to cause the processing device to provide data associated with an area surrounding the base-location to the first mobile device, wherein the directional range is a part of the area surrounding the base-location selected by a user of the first mobile device.

18. The server of claim 17, wherein a radius of the area surrounding the base-location is determined based on a selection by the user of the first mobile device, based on a preset value, or a combination thereof.

19. The server of claim 17, wherein the base-location is a current location of the first mobile device.

20. The server of claim 13, wherein the text message is an email, a text message, an alert, or a combination thereof.

21. A method comprising:
displaying a user interface to a user on a first mobile device, the user interface configured to include a plurality of input fields for receiving a plurality of inputs from the user, the plurality of input fields including a first input field for identifying a directional range for sending a text message to a second mobile device within the directional range, and a second input field for the text message to be sent to the second mobile device;
receiving, at a server, via the first input field of the user interface and from the first mobile device, input identifying the directional range;
displaying via the user interface to the user a location of the second mobile device on a map, the location being within the identified directional range;
receiving, at the server, via the second input field of the user interface and from the first mobile device, the text message to be sent to the second mobile device; and
in response to receiving the text message, sending the text message from the server to the second mobile device.

22. The method of claim 21, further comprising:
displaying via the user interface to the user a third input field for identifying a group contact list including a plurality of Mobile Directory Numbers (MDNs);
receiving, via the third input field of the user interface and from the first mobile device, a group contact list including a plurality of Mobile Directory Numbers (MDNs);
identifying a location associated with each MDN in the group contact list;
determining whether the identified location associated with at least one of the MDNs in the group contact list falls within the identified directional range; and
upon determining that at least one of the MDNs listed in the group contact list falls within the identified directional range, identifying a mobile device associated with the at least one MDN as the second mobile device.

\* \* \* \* \*